United States Patent [19]
Speigner et al.

[11] 3,868,625
[45] Feb. 25, 1975

[54] SURGE INDICATOR FOR TURBINE ENGINES

[75] Inventors: Jack D. Speigner, Lake Park; Frank B. Thompson, North Palm Beach, both of Fla.

[73] Assignee: United Aircraft Corporation, East Hartford, Conn.

[22] Filed: Sept. 24, 1973

[21] Appl. No.: 400,307

Related U.S. Application Data

[63] Continuation-in-part of Ser. No. 316,941, Dec. 20, 1972, abandoned.

[52] U.S. Cl. ............... 340/27 SS, 73/115, 73/116, 60/223, 60/39.28 R
[51] Int. Cl. .................................... G01m 15/00
[58] Field of Search ...... 60/39.28 R, 34.29, 226 R, 60/240, 243, 223; 340/27 SS, 27 R; 73/115, 116; 415/1, 26–29

[56] References Cited
UNITED STATES PATENTS

| | | | |
|---|---|---|---|
| 3,267,669 | 8/1966 | Tissier | 60/39.28 R |
| 3,392,739 | 7/1968 | Taplin et al. | 60/39.28 R |
| 3,671,134 | 6/1972 | Boothe | 60/39.28 R |
| 3,677,000 | 7/1972 | Thomson | 60/39.28 R |

Primary Examiner—C. J. Husar
Assistant Examiner—Robert E. Garrett
Attorney, Agent, or Firm—Donald F. Bradley

[57] ABSTRACT

A pair of pressure transducers, one having a high response capability and the other a low response capability, are positioned in a turbofan or turbojet engine flow passage. The output from the high response transducer is passed through a notch filter to isolate the frequencies of interest. The output from the low response transducer is passed through a low pass filter to provide the absolute steady-state pressure level. The ratio of the high frequency pressure signal within the frequency range of interest to the steady-state pressure signal is calculated and compared to a reference ratio signal. If the calculated pressure ratio signal exceeds the reference ratio signal, the engine is approaching a surge condition, and a warning signal is generated which can be used for rescheduling of the engine away from stall. The apparatus may be used both to anticipate surge and to sense the actual occurrence of a surge condition.

The invention herein described was made in the course of or under a contract with the Department of the Air Force.

14 Claims, 1 Drawing Figure

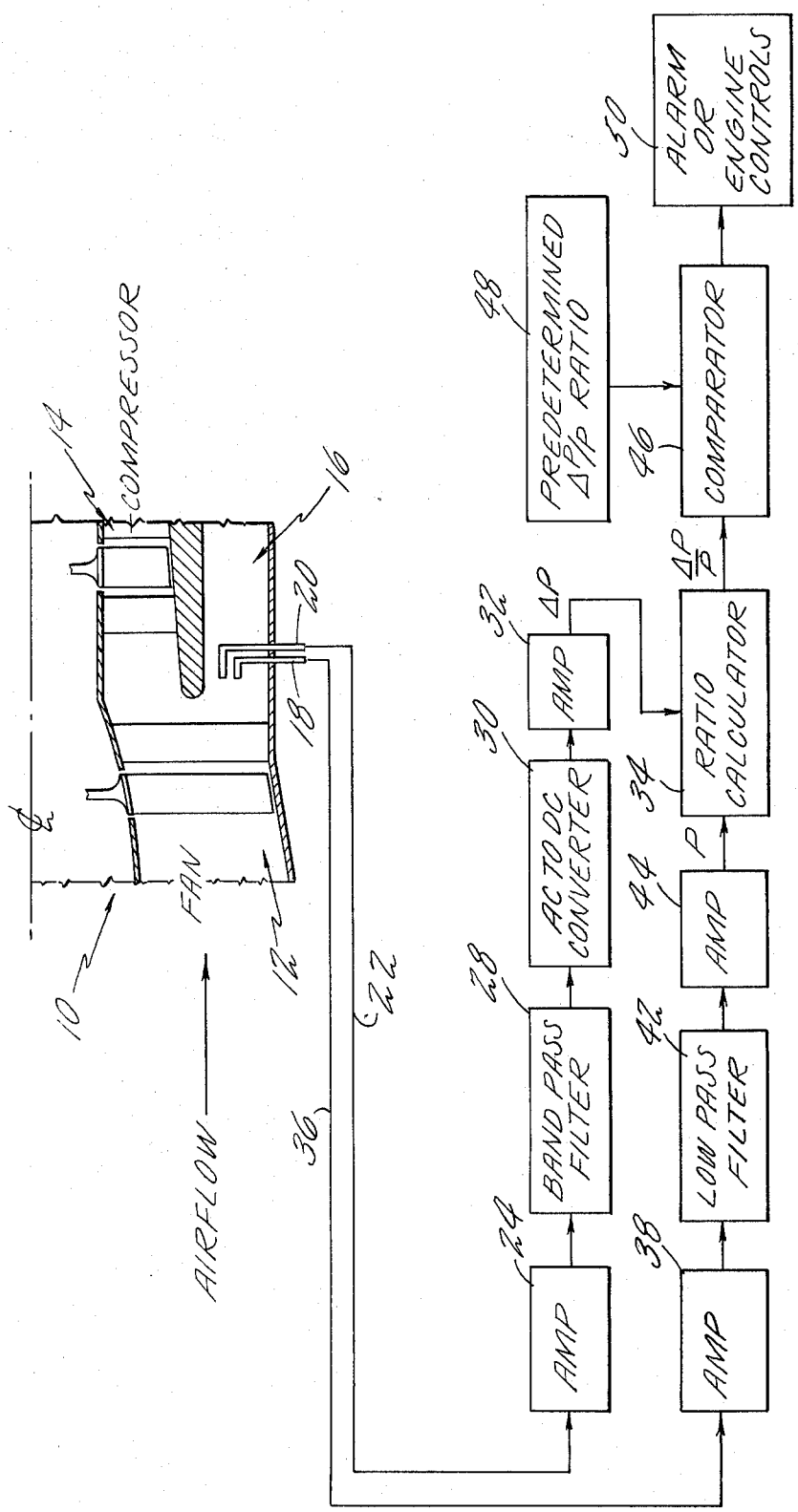

SURGE INDICATOR FOR TURBINE ENGINES

CROSS-REFERENCE TO RELATED APPLICATION

This is a continuation-in-part of application Ser. No. 316,941, filed Dec. 20, 1972, and now abandoned.

BACKGROUND OF THE INVENTION

1. Field of the Invention

This invention relates to turbine engines, and particularly to a method and apparatus for sensing when the engine is operating in or near a surge condition. The present invention senses incipient or imminent surge in the fan or compressor portion of the engine prior to a complete engine flow breakdown. By anticipating or sensing the onset of surge, corrective action can be taken to avoid the actual surge condition thereby prolonging engine life, preventing severely degraded engine performance and adding to the operational safety margin of aircraft utilizing turbine engines. Superior performance can also be realized from a turbine engine which, because of the protection offered by the method and apparatus of this invention, may be operated at minimum surge margin.

The method and apparatus of this invention may also be applied advantageously to non-flight turbine engines and/or fan and compressor rig testing during which intentional surges must be induced to define and document the surge line. By identifying the point of surge imminence, yet avoiding the mechanical and/or aerodynamic loading imposed by the surge condition, much more data and longer hardware life can be realized.

2. Description of the Prior Art

High performance aircraft gas turbine propulsion systems have an unfortunate history of in-flight stall and/or surge problems. Turbojet and turbofan engine surges may result in a complete engine internal flow breakdown, thereby creating severely reduced engine and aircraft performance. Every effort is therefore made to prevent in-flight engine surges, including thermo-aerodynamic matching of the engine so that it will withstand the most detrimental anticipated operating conditions. Designing the engine to the "worst case," however, reduces engine performance during many flight conditions.

There are also mechanical and aerodynamic variations which occur between individual engines of the same type. Since the general engine operational limits are arbitrarily set for the "worst" engine, maximum power and economy may not be realized from a given engine. By means of this invention, a turbine engine can be operated much closer to its maximum power rating since the imminence or onset of a surge condition can be sensed, and corrective action taken, before complete engine surge occurs.

It is known that engine surge produces characteristic pressure oscillations in many flow passages in the engine. Specifically, it has been suggested in U.S. Pat. No. 2,926,524 to Sanders that a pressure sensing probe positioned in the compressor inlet duct or annulus, or in the first compressor stage upstream of the rotor, may be used to detect the characteristic frequencies produced when stall or surge is occurring. U.S. Pat. No. 3,671,134 to Boothe suggests the use of a fluidic signal detector to determine incipient stall in the compression system of a single spool turbojet engine by sensing rapid fluctuations in the output pressure of the compressor in the range of 250Hz to 1,000Hz. U.S. Pat. No. 3,245,219 to Warden, et al., uses an electroacoustical pickup device mounted adjacent to the low compressor stage to sense discrete sonic frequencies whose occurrence can be correlated with an incipient surge or stall condition.

The present invention is an improvement over the prior art devices and methods and is useful in anticipating or sensing surge in a turbofan or turbojet engine at a time much earlier than the prior art devices. As applied specifically to a turbofan engine, by measuring the aerodynamic characteristics of the engine in the fan discharge portion, greater real time warning is available before actual engine surge occurs, allowing more time for corrective action to be taken to avoid surge. In addition, the present invention provides a novel pressure ratio signal which is unaffected by altitude or aircraft flight condition changes and which is therefore more reliable than the prior art devices.

It is therefore an object of this invention to provide a novel method and apparatus for determining the imminence or onset of surge in a turbofan or turbojet engine.

Another object of this invention is a method and apparatus for computing the ratio of characteristic pressure frequencies to steady-state pressure in a turbojet or turbofan engine and comparing the ratio with a reference ratio to determine when a surge condition of operation of the engine exists or is imminent.

SUMMARY OF THE INVENTION

In accordance with a preferred embodiment of the present invention, a signal may be generated indicating that a surge condition is about to occur. A pair of pressure sensitive transducers are positioned in an engine flow path such as the fan discharge path of a turbofan engine. One of the pressure transducers is a high response device sensitive to a frequency range such as 0 to 1,000Hz. The output from the high response transducer is passed through a band pass filter to isolate the frequencies of interest, approximately 10 to 250Hz, and to attenuate the pressure oscillation frequencies outside this range. The other of said transducers is a low response device which responds only to low pressure frequencies. The output from the low response transducer is passed through a low pass filter to attuenate all frequencies above about ¼Hz and pass therethrough only low frequencies equivalent to the steady-state absolute pressure level. The ratio of the amplitudes of the high frequency pressure oscillations to the steady-state signal is electronically computed in a ratio calculator, and this ratio is continuously compared with a predetermined reference ratio in a comparator. If the computed ratio is higher than the reference ratio, the imminence or existence of a surge condition is signaled and corrective action may be taken or a warning signal may be produced.

The actual onset of surge may also be sensed by passing through the high response transducer frequencies in the 10-90Hz range and modifying the predetermined ratio accordingly. By means of the present invention the surge condition may be sensed and a warning signal generated in very short times, nominally 0.03 seconds, and corrective action may be taken to prevent rotating stall and non-recoverable surge.

BRIEF DESCRIPTION OF THE DRAWING

The drawing is a schematic of a turbofan engine showing the installation of pressure sensitive transducers and their connection to the near surge indicating system shown in block diagram form.

DESCRIPTION OF THE PREFERRED EMBODIMENT

In the drawing, there is shown in schematic form a portion of a typical axial flow turbofan engine 10. In turbofan engines, air is passed through the engine inlet into the fan stage 12 where the air is compressed by means of rotating fan blades and fixed stators. More than one fan stage 12 may be provided. A portion of the fan air is then passed into a multi-stage compressor 14 where further compression of the air takes place, this air being combusted and passed through turbines which drive the fan and compressor stages, and ultimately being passed through a nozzle resulting in forward propulsive thrust from the engine. Another portion of the compressed fan air is fed into a bypass duct 16 to create additional thrust from the engine, the fan air being exhausted separately or being remixed with the main airstream and being exhausted.

A pair of pressure sensitive transducers 18 and 20 are located so as to measure the pressure in the fan discharge flow path and respond to both the variations in amplitude and frequency of the pressure of the air which passes through the fan stage 12. Although schematically shown as located in the fan bypass duct, the transducers 18 and 20 may be positioned at any convenient location in the path of the fan discharge. From an engine safety standpoint it is advantageous to position the transducers in the duct airflow path as opposed to the core to preclude damage to downstream rotating stages should a failure occur.

Pressure transducer 20 is preferably a high response transducer which will respond to a range of pressure frequencies such as 0 to 1,000Hz, and at least 0 to 100Hz. Pressure transducer 18 is a low response transducer which responds to low pressure frequencies such as those under 10Hz. Transducers 18 and 20 may be combined into a single transducer which has the desired response over the entire frequency range of interest, with the selected frequencies being provided by means of filters.

The signal from high response pressure transducer 20 is fed through a signal line 22 into a signal conditioning amplifier 24 which provides isolation and the required gain to the high response pressure signal.

The output from amplifier 24 is fed to a band pass filter 28, which may be a notch-type filter, and which passes therethrough only the pressure frequencies of interest, approximately between 10 and 250Hz depending upon the precise fan aerodynamics, and attenuates the pressure frequencies outside that range.

The output from the band pass filter 28 is fed to a converter 30 which converts the AC output signal from the pressure transducer 20 into a DC signal for use in the subsequent ratio calculation. The DC output from converter 30, which is proportional to the amplitude of the pressure signals in the frequency range passed through filter 28, is then passed through a gain normalization amplifier 32 and fed as one of the two inputs into a ratio calculator 34.

The output from the low response pressure transducer 18 is fed through a signal line 36 into an amplifier 38, the amplifier being similar to amplifier 24. The output from amplifier 38 is fed into a low pass filter 42 which may also contain a residual balance adjustment. The low pass filter eliminates all frequencies above, for example, 1Hz, and preferably above one-quarter Hz. The output signal from low pass filter 42 is essentially DC, and has an amplitude proportional to the absolute steady-state pressure in the fan exhaust. The output from the low pass filter 42 is fed to a gain normalization amplifier 44 and then into the ratio calculator 34.

The ratio calculator 34 may be a simple integrated circuit network which electronically derives the ratio of the pressure amplitudes of the high response signal from amplifier 32 with respect to the low response signal from amplifier 44. Mathematically, the ratio calculator produces an output signal proportional to $\Delta P$ (high response)/$P$ (low response) and feeds this ratio signal into a comparator 46. The comparator compares the $\Delta P/P$ signal to a predetermined $\Delta P/P$ reference ratio fed to the comparator 46 as shown by block 48. The predetermined reference ratio may be a fixed ratio, or may be variable dependent upon engine speed, mass flow through the engine, temperature, or any combination of engine and/or external parameters. For typical turbofan engines in normal oeprational regimes, the predetermined $\Delta P/P$ ratio is in the range of 0.01 to 0.2. If the actual $\Delta P/P$ ratio from calculator 34 is greater than the predetermined $\Delta P/P$ ratio from block 48, the engine is near surge and an output signal is generated by and fed from comparator 46. The output signal can be sent to an engine control requesting corrective action to prevent or alleviate surge, or the signal can be used to activate an alarm, as shown in block 50. Corrective action could include opening bleeds in the engine, opening the gas generator and/or fan bypass nozzles, decreasing fuel flow, or resetting variable fan and/or compressor stators. The alarm could include a light or buzzer, or a flag indicative of a control reset.

The advantage of the use of a ratio calculation as opposed to a simple pressure amplitude monitor is that any change in engine inlet pressure, and a proportional change in fan discharge pressure, resulting from changes in aircraft flight regime, aircraft angle of attack or any other parameter will be sensed by both pressure transducers 18 and 20, and will affect both the $\Delta P$ and $P$ signals equally. The ratio calculator 34 thereby normalizes the high frequency pressure signal for changes in operating conditions, and enables increased reliability over prior art systems.

By inserting the pressure transducers in close proximity to and submerged in the fan discharge flow path, the earliest possible warning may be provided of imminent surge. Tests have shown that the system of this invention provided a warning 3.3 seconds in advance of a recorded turbofan engine surge, giving sufficient time for the engine controls to be activated to prevent the onset of surge. It is apparent that another set of pressure sensors could be employed at the high pressure compressor discharge for additional sampling of the engine aerodynamics.

The predetermined $\Delta P/P$ ratio may vary slightly depending upon the particular turbofan engine and the exact location and accuracy of the pressure transducers, and it may be necessary to empirically predetermine the maximum $\Delta P/P$ ratio for a given engine depending on its anticipated use.

The above-described apparatus is quite accurate in providing the earliest possible indication of surge prior to the time that the actual surge condition has manifested itself, and can be referred to as a "near surge indicator." The apparatus has also been found to be of significant value in providing a very rapid indication of the actual occurrence or onset of surge, i.e., the same apparatus may be used as a "quick surge indicator." In this latter mode of operation, a signal may be sent to the engine control to take appropriate post-surge action in time to prevent the formation of compressor rotating stall, thereby allowing automatic engine selfrecovery from surge. This mode of operation is applicable to both turbojet and turbofan engines, and requires only minor modifications to the apparatus.

If rotating stall develops after a compressor surge, it is likely that a turbine engine cannot recover from the surge and must be shut down. If the compressor surge can be detected and eliminated before the formation of rotating stall, automatic engine recovery normally occurs. Detection and elimination of the surge must occur very quickly since frequently there is only ⅓ to 3 seconds maximum between the first compressor surge cycle and the formation of a rotating stall cell in the engine core. It is therefore necessary that, when operating as a quick surge indicator, the apparatus detect the first or second compressor surge cycle and emit its signal to the engine control immediately in order to have sufficient time to prevent compressor rotating stall.

The quick surge indicator is identical in structure to the near surge indicator, and uses data from one or more high response pressure probes located at the fan discharge-compressor inlet plane. When compressor surge occurs, cyclic pressure perturbations of approximately 10 to 20Hz frequency are emitted forward out of the compressor prior to rotating stall formation. These perturbations can be detected and recognized by apparatus as shown in the drawing, except that the frequency of the band pass filter 28 is tuned to pass a different frequency range, and the predetermined $\Delta P/P$ ratio computed in block 48 is slightly altered from the near surge indicator. It has been determined experimentally for a particular twinspool turbofan engine that the compressor surge pressure cycle has a fundamental frequency of approximately 10 to 20Hz with multiple harmonics up to approximately 90Hz so that a band pass filter 28 of 10–90Hz improves resolution of the surge signal. The $\Delta P/P$ ratio signal computed in block 48 is set in the range of 0.05 to 0.70 depending on the specific engine configuration.

In operation the quick surge indicator described above has been found to detect surge reliably (near 100 percent reliability) and issue a warning signal in between 0.01 to 0.1 seconds, nominally 0.03 seconds. Control actuators which respond to receipt of the surge signal have been used to open the jet nozzle area, vary the vane camber at the compressor inlet, and reduce fuel flow for time durations of from ½ to 1-½ seconds and successfully permit automatic engine self-recovery from surge.

It is apparent that the surge indicator of this invention may be used as a monitor for engine test purposes during engine development to determine the surge characteristics of the engine without at the same time exposing the engine to the detrimental effects of surge.

It is also apparent that the data signatures of incipient surge will vary slightly in their unique frequency and amplitude characteristics depending upon specific engine aerodynamics and the location of the pressure transducers, and that therefore it may be necessary to vary the frequency response of the band pass filter 28 and the low pass filter 42 and the $\Delta P/P$ ratio for varying engines and varying conditions of operation.

Although the invention has been described in tis preferred embodiment for use in the fan discharge flow path of a turbofan engine, it is apparent that the concepts of the invention may be applied to turbojet engines or to the compressor stage of a turbofan engine where the pressure pickups would be located in the compressor discharge flow path. The frequency range of the band pass filter 28 would be adjusted to pass those frequencies determined to be representative of the specific engine aerodynamics, and the reference ratio would be modified accordingly.

While the invention has been described in terms of electronic circuitry, it will be apparent that those skilled in the art may incorporate mechanical, fluidic or other components, and that other changes may be made in the combination and arrangement of the surge indicator and its method of operation without departing from the scope of this invention as hereinafter claimed.

We claim:

1. An indicator for a turbine engine comprising
pressure sensing means positioned in a flow path of said engine and producing signals which are a function of the gas pressure oscillations therein,
a band pass filter connected to receive said signals and passing therethrough only the high frequency signal components characteristic of engine surge,
a low pass filter connected to receive said signals and passing therethrough only the low frequency signal components indicative of the steady-state pressure,
a ratio calculator receiving said high frequency signal components and said low frequency signal components and producing a ratio signal which is a function of the ratio of the amplitudes of the high frequency signal components to the low frequency signal components,
a reference signal, and
comparator means for comparing the ratio signal with said reference signal and producing an output signal when said ratio signal exceeds said reference signal.

2. An indicator as in claim 1 in which said pressure sensing means comprises a first high response pressure transducer, and a second low response pressure transducer.

3. An indicator as in claim 2 in which the signals produced by said first transducer are fed to said band pass filter, and the signals produced by said second transducer are fed to said low pass filter.

4. An indicator as in claim 1 in which the high frequency signal components passed through said band pass filter are in the approximate range of 10Hz to 250Hz, and in which said reference signal is equivalent to a ratio of the amplitudes of said high frequency signal components to said low frequency signal components in the range of 0.01 to 0.2.

5. An indicator as in claim 1 in which the high frequency signal components passed through said band pass filter are in the approximate range of 10Hz to 90Hz, and in which said reference signal is equivalent to a ratio of the amplitudes of said high frequency signal components to said low frequency signal components in the range of 0.05 to 0.70.

6. An indicator as in claim 1 in which the low frequency signal components passed through said low pass filter are below about 1Hz.

7. An indicator as in claim 1 in which said pressure sensing means is positioned in the fan duct airflow path of a turbofan engine.

8. A method for determining the imminence of surge in a turbojet engine comprising the steps of
producing signals indicative of the gas pressure oscillations which occur in a flow path of said engine,
modifying said gas pressure oscillation signals by removing therefrom the frequency components which are not characteristic of imminent engine surge,
developing from said gas pressue oscillation signals a steady-state pressure signal,
computing the ratio of the amplitudes of said modified gas pressure oscillation signals to said steady-state pressure signal to produce a ratio signal, and
comparing said ratio signal with a predetermined reference ratio signal.

9. A method as in claim 8 and including the step of generating an output signal indicative of the imminence of surge in said engine when said ratio signal exceeds said predetermined reference signal.

10. A method as in claim 8 in which said predetermined reference signal is equivalent to a ratio of the amplitudes of said modified gas pressure oscillation signals to said steady-state pressure oscillation signal in the range of 0.01 to 0.2.

11. A method for determining the onset of surge in a turbojet engine comprising the steps of
producing signals indicative of the gas pressure oscillations which occur in a flow path of said engine,
modifying said gas pressure oscillation signals by removing therefrom the frequency components which are not characteristic of the onset of engine surge,
developing from said gas pressure oscillation signals a steady-state pressure signal,
computing the ratio of the amplitudes of said modified gas pressure oscillation signals to said steady-state pressure signal to produce a ratio signal, and
comparing said ratio signal with a predetermined reference ratio signal.

12. A method as in claim 9 and including the step of generating an output signal indicative of the onset of surge in said engine when said ratio signal exceeds said predetermined reference signal.

13. A method as in claim 9 in which said predetermined reference signal is equivalent to a ratio of the amplitudes of said modified gas pressure oscillation signals to said steady-state pressure signal in the range of 0.05 to 0.70.

14. A method for determining incipient surge in a turbofan engine comprising the steps of
producing from a pressure sensor inserted in the fan discharge flow path of said engine a first signal indicative of the high frequency gas pressure oscillations characteristic of incipient engine surge,
producing from a pressure sensor inserted in the fan discharge flow path of said engine a second signal indicative of the steady-state gas pressure in said flow path,
computing the ratio of said first signal to said second signal, and
signifying incipient engine surge when said ratio exceeds a predetermined ratio.

* * * * *